United States Patent
Morris et al.

(10) Patent No.: US 10,614,427 B2
(45) Date of Patent: Apr. 7, 2020

(54) SYSTEMS AND METHODS FOR MONETIZING BUILDING MANAGEMENT SYSTEM SOFTWARE DEPLOYMENT

(71) Applicant: Johnson Controls Technology Company, Plymouth, MI (US)

(72) Inventors: Joseph Morris, Monsey, NY (US); Suresh R. Sunderesan, Brookfield, WI (US); James R. Beninghaus, Campbell, CA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 636 days.

(21) Appl. No.: 15/331,795

(22) Filed: Oct. 21, 2016

(65) Prior Publication Data

US 2018/0114197 A1    Apr. 26, 2018

(51) Int. Cl.

| | |
|---|---|
| *G06Q 10/10* | (2012.01) |
| *G06Q 10/00* | (2012.01) |
| *G06Q 30/00* | (2012.01) |
| *F24F 11/30* | (2018.01) |
| *G06Q 50/06* | (2012.01) |

(Continued)

(52) U.S. Cl.
CPC .......... *G06Q 10/1097* (2013.01); *F24F 11/30* (2018.01); *F24F 11/62* (2018.01); *G06Q 10/20* (2013.01); *G06Q 30/018* (2013.01); *G06Q 50/06* (2013.01); *F24F 11/46* (2018.01)

(58) Field of Classification Search
CPC .. G06Q 10/1097; G06Q 10/20; G06Q 30/018; G06Q 50/06; F24F 11/62; F24F 11/30

USPC ........................................................ 705/7.21
See application file for complete search history.

(56) References Cited

U.S. PATENT DOCUMENTS

| | | | |
|---|---|---|---|
| 9,092,651 B2 * | 7/2015 | Ching | G06K 5/00 |
| 2001/0034846 A1 * | 10/2001 | Beery | G06F 21/121 |
| | | | 726/28 |

(Continued)

FOREIGN PATENT DOCUMENTS

| | | | | |
|---|---|---|---|---|
| EP | 3460690 A1 * | 3/2019 | | G06Q 10/06 |

OTHER PUBLICATIONS

PC World, How to find your Windows or Office product key. Michael King, Ian Paul. Aug. 1, 2016. pp. 2-3.*

*Primary Examiner* — Dylan C White
(74) *Attorney, Agent, or Firm* — Foley & Lardner LLP (57) ABSTRACT

A system for monetizing deployment of building management software configured to operate an HVAC device includes one or more processors coupled to non-transitory memory. The one or more processors are configured to create a service task for a field technician including information identifying the building management software to be installed on an end device. The one or more processors are further configured to generate a unique product key and attach the unique product key to the service task, transmit the service task to a field technician platform configured to be accessed by the field technician, validate bound data received from the field technician platform, the bound data comprising end device fingerprint information and the unique product key. The one or more processors are further configured to generate a license file configured to complete installation of the building management software.

18 Claims, 10 Drawing Sheets

(51) Int. Cl.
*F24F 11/62* (2018.01)
*F24F 11/46* (2018.01)

(56) References Cited

U.S. PATENT DOCUMENTS

| | | | |
|---|---|---|---|
| 2004/0153658 A1* | 8/2004 | Gunyakti | G06F 21/121 |
| | | | 713/193 |
| 2005/0066324 A1* | 3/2005 | Delgado | G06F 8/61 |
| | | | 717/170 |
| 2005/0182732 A1* | 8/2005 | Miller | G06F 21/10 |
| | | | 705/59 |
| 2008/0209569 A1* | 8/2008 | Araki | G06F 21/105 |
| | | | 726/26 |
| 2008/0235106 A1* | 9/2008 | Reisman | G06F 8/65 |
| | | | 705/64 |
| 2013/0092731 A1* | 4/2013 | Pettersson | G06K 19/08 |
| | | | 235/375 |
| 2014/0248852 A1* | 9/2014 | Raleigh | H04M 15/723 |
| | | | 455/407 |
| 2014/0366149 A1* | 12/2014 | Pesl | G06F 21/10 |
| | | | 726/26 |
| 2015/0195714 A1* | 7/2015 | Raleigh | G06Q 10/06375 |
| | | | 455/411 |
| 2019/0258782 A1* | 8/2019 | Lerner | H04L 63/101 |

* cited by examiner

SYSTEMS AND METHODS FOR MONETIZING BUILDING MANAGEMENT SYSTEM SOFTWARE DEPLOYMENT

BACKGROUND

The present disclosure relates generally to software monetization systems, and more particularly to systems and methods for monetizing a software installation process via product key management.

Product keys are used as a common means to prevent software piracy. In order to complete a software installation procedure, a customer must enter a product key into a field of the software user interface. Without entry of this product key, the installation may be halted or the software may be installed lacking full functionality. However, the efficacy of product keys as a means to prevent piracy is limited when product keys may be reused and are distributed freely to salespeople, installation technicians, and customers. Therefore, systems and methods to manage and restrict unauthorized access to software product keys would be useful.

SUMMARY OF THE INVENTION

One implementation of the present disclosure is a system for monetizing deployment of building management software configured to operate an HVAC device includes one or more processors coupled to non-transitory memory. The one or more processors are configured to create a service task for a field technician including information identifying the building management software to be installed on an end device. The one or more processors are further configured to generate a unique product key and attach the unique product key to the service task, transmit the service task to a field technician platform configured to be accessed by the field technician, validate bound data received from the field technician platform, the bound data comprising end device fingerprint information and the unique product key. The one or more processors are further configured to generate a license file configured to complete installation of the building management software.

A further implementation of the present disclosure is a method for monetizing deployment of building management software configured to operate an HVAC device. The method includes creating a service task for a field technician including information identifying the building management software to be installed on an end device, generating a unique product key and attaching the unique product key to the service task, and transmitting the service task to a field technician platform configured to be accessed by the field technician. The method further includes validating bound data received from the field technician platform, the bound data comprising end device fingerprint information and the unique product key, and generating a license file configured to complete installation of the building management software.

A further implementation of the present disclosure is a method for monetizing software deployment. The method includes creating a service task for a field technician, the service task comprising an installation date and time, generating a unique product key and attaching the unique product key to the service task. and transmitting the service task to a field technician platform configured to be accessed by the field technician. The method further includes validating bound data received from the field technician platform, the bound data comprising end device fingerprint information and the unique product key, and generating a license file configured to complete installation of the software.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for monetizing aspects of a software installation process are depicted, according to various exemplary embodiments. In current software license distribution systems, a software manufacturer generally distributes product keys to their salespeople and technicians either in hard copy form or electronically. The salespeople and technicians, in turn, distribute the product keys to the software customers. Product keys are alphanumeric codes that may be entered into appropriate fields of a software user interface during an installation procedure. Once entered, the software program contacts a license server that verifies the product key and generates a license file that completes the installation. Generally, product keys are not associated with a particular computer system or with a particular installation time period, meaning that software may be vulnerable to piracy if customers, technicians, or salespeople share (i.e., reuse) product keys with unauthorized persons or systems that have not purchased the software license.

Figure 1:
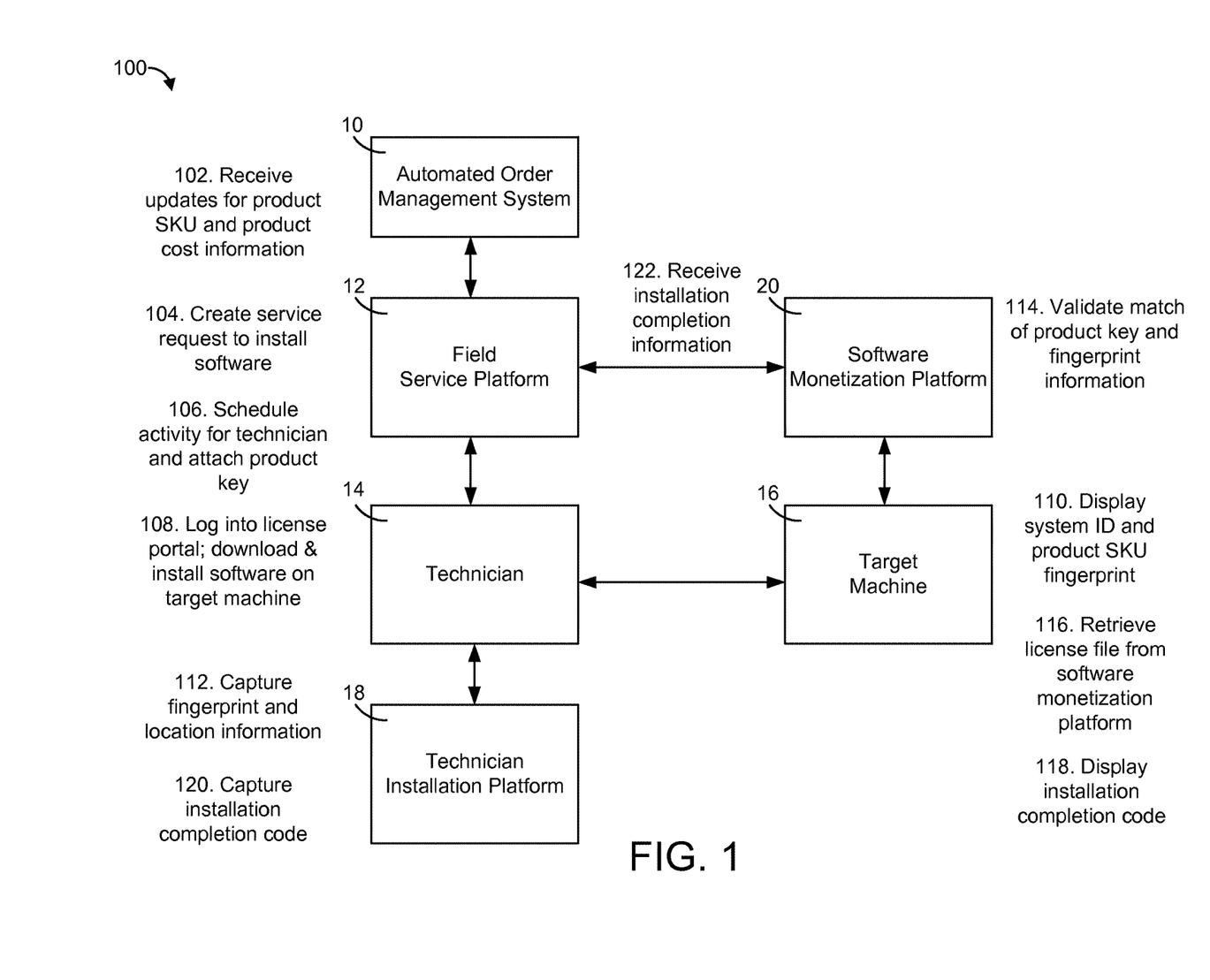
FIG. 1 is a flowchart of a software ordering and licensing process in which the technician installation platform is online, according to some embodiments.

Referring now to FIG. 1, a flowchart of a software ordering and licensing process 100 in which the technician installation platform is online is depicted, according to an example embodiment. Process 100 is implemented by utilizing automated order management system 10, field service platform 12, technician 14, target machine 16, technician installation platform 18, and software monetization platform 20. Several of these components are computer systems that contain processing circuits, described in further detail below. Each of these components may be connected via a wired or wireless network, using any suitable communications protocol.

The components of a computer system processing circuit may include a processor and memory. The processor may be a general purpose or specific purpose processor, an application specific integrated circuit (ASIC), one or more field programmable gate arrays (FPGAs), a group of processing components, or other suitable processing components. The processor may be configured to execute computer code or instructions stored in memory or received from other computer readable media (e.g., CDROM, network storage, a remote server, etc.).

Memory may include one or more devices (e.g., memory units, memory devices, storage devices, etc.) for storing data and/or computer code for completing and/or facilitating the various processes described in the present disclosure. Memory may include random access memory (RAM), read-only memory (ROM), hard drive storage, temporary storage, non-volatile memory, flash memory, optical memory, or any other suitable memory for storing software objects and/or computer instructions. Memory may include database components, object code components, script components, or any other type of information structure for supporting the various activities and information structures described in the present disclosure. Memory may be communicably connected to a processor via a processing circuit and may include computer code for executing (e.g., by a processor) one or more processes described herein.

Still referring to FIG. 1, automated order management system 10 is a system configured to collect and transmit data regarding software offered for sale by a software manufacturer. This data may include software product names, descriptions, cost information, and stock keeping unit codes (SKUs). A SKU is a unique identifier or code that is assigned by a manufacturer or a merchant to identify and track a distinct type of product offered for sale. In some embodiments, the data collection and transmitting functions performed by automated order management system 10 are manually performed by a user. Field service platform 12 is a computer system configured to collect customer orders and operate servers dedicated to distributing software. In some embodiments, field service platform 12 is owned and operated by the entity that manufactures the software managed through field service platform 12. In other embodiments, field service platform 12 is owned and operated by a third party entity.

Field service platform 12 is configured to send dispatch instructions to technician 14 to perform service requests. Technician 14 is a person trained to install software at a customer site. In some embodiments, technician 14 is an employee of the software manufacturer. In other embodiments, technician 14 is an independent contractor or an employee of the entity that operates field service platform 12. Technician 14 installs software on target machine 16. Target machine 16 may be any computer system owned by a customer and configured to run installed software. For example, in some embodiments, target machine 16 is a server configured to run a building management system (BMS) that may control, monitor, or manage equipment in or around a building or building area. A BMS can include a heating, ventilation, and air conditioning (HVAC) system, a security system, a lighting system, a fire alerting system, another system that is capable of managing building functions or devices, or any combination thereof.

Technician 14 performs the software installation with the assistance of technician installation platform 18. Technician installation platform 18 is configured to capture and transmit information to verify the identity of the target machine and the completion of the installation. For example, in some embodiments, technician installation platform 18 may be configured to take or receive a picture of a quick response (QR) code that contains embedded information identifying target machine 16. In other embodiments, technician platform 18 includes fields that permit technician 14 to enter information identifying target machine 16 manually. In some embodiments, technician installation platform 18 is a mobile application installed on a mobile device (e.g., a mobile phone, a tablet) operated by technician 14. In other embodiments, technician installation platform 18 is installed on a laptop or desktop computer. In still further embodiments, technician platform 18 is a web-based application that is accessed through any type of mobile or non-mobile device.

Software monetization platform 20 is a computer system configured to manage software licensing through the use of product keys. For example, monetization platform 20 may be configured to generate a product key in response to the receipt of a service request from field service platform 12. Monetization platform 20 may be further configured to validate installation information received from technician 14 and technician installation platform 18. In some embodiments, validation of the installation information includes verifying that the received product key matches the target machine and/or customer information contained in the service request created by field service platform 12. Once software monetization platform 20 has completed this validation, it may be configured to generate and transmit a license file to target machine 16 to complete the software installation process.

Still referring to FIG. 1, at step 102 of the process 100, automated order management system 10 transmits information regarding software products to field service platform 12. For example, this information may include prices and SKUs of software products. At step 104, a customer service agent creates a service request to install software in field service platform 12. The service request contains details related to the software installation, including, but not limited to: a purchase order number or alphanumeric code, a software product SKU, a customer number and/or identifier, customer contact information, and a ticket number. In some embodiments, the software is or is configured to function as a component of Johnson Controls' METASYS® brand building automation system software platform. In other embodiments, the software is or is configured to function as a component of Johnson Controls' PANOPTIX® brand building efficiency system software platform. When the customer service agent completes the service request, it may enter a service request queue of all unfulfilled service requests. At some point after the service request enters the queue, field service platform 12 transmits the request to software monetization platform 20. In some embodiments, the time at which field service platform 12 transmits the request may be based on a priority assigned to the service request, a purchase amount associated with the service request, or some other factor.

In response to receipt of the service request, software monetization platform 20 generates and transmits a product key to field service platform 12. In some embodiments, the product key is an alphanumeric code that is unique to each software product license and is used to validate the software during the installation of the software license. At step 106, a customer service agent retrieves the service request from the queue and schedules an installation activity for technician 14. Step 106 further includes attaching the product key to the scheduled installation. In some embodiments, the retrieval of the service request from the queue, the scheduling of the installation activity, and the attachment of the product key will all be performed by the field service platform automatically. By associating the unique product key with the scheduled installation, it is possible to ensure both that the correct software is installed at the correct location, and that the product key cannot be reused. For example, if an installation activity is scheduled to take place on the first day of the month at 2 PM, software monetization platform 20 may fail to validate any attempted use of the product key after the scheduled installation (e.g., attempted use of the product key on the second day of the month, attempted use of the product key on the first day of the month at 6 PM). In some embodiments, the period of time the product key is valid after the scheduled installation may be configurable by an administrator of software monetization platform 20.

At step 108, technician 14 arrives at the site of target machine 16 to begin the scheduled installation. Using target machine 16, technician 14 logs into a license portal (via wired or wireless network) to download the software to be installed on target machine 16. In some embodiments, the license portal is maintained by field service platform 12. Once technician 14 has successfully logged into the portal, the technician selects the software to be installed and downloads an installation file to target machine 16 to begin the installation process. At step 110, once the installation is partially complete on target machine 16, the installation halts and target machine 16 displays end device "fingerprint" information to identify both the software being installed (e.g., via a product SKU) and target machine 16 (e.g., via a system ID number). In some embodiments, this end device fingerprint information is displayed as a QR code. In other embodiments, the end device fingerprint information is displayed as bar code or alphanumeric code.

At step 112, technician 14 captures the end device fingerprint information into technician installation platform 18. In some embodiments, capturing this information includes taking a picture of the QR code, bar code, or alphanumeric code using a camera on the mobile device where technician installation platform 18 is installed. In some embodiments, in addition to capturing end device fingerprint information, technician installation platform 18 may also capture location information (e.g., via GPS functionality of the mobile device) in order to verify that the software is being installed at the correct customer location. Once all identifying information is captured and bundled, technician installation platform 18 transmits the bundle to field service platform 12, which attaches the product key to the bundle. Thus, technician 14 has no interaction with or visibility to the product key, eliminating the risk of piracy initiated by the technician. Field service platform 12 then transmits the bundle to software monetization platform 20.

Still referring to FIG. 1, at step 114, software monetization platform 20 receives the bundle of the end device fingerprint information and product key and validates this information to ensure it matches as expected. For example, if the bundle arrives after the time of the scheduled service request, the product key may be invalidated and software monetization platform 20 will not generate a license file. However, if the end device fingerprint information, customer location, and time of transmission of the information all match the expected information in the product request, software monetization platform 20 generates a license file which is retrieved by target machine 16 at step 116. Continuing with step 118, target machine 16 completes the installation using the license file and displays an installation completion code. In various embodiments, similar to step 110, the installation completion code may be a QR code, bar code, or alphanumeric code. At step 120, similar to step 112, technician 14 captures the installation completion code (e.g., by taking a picture of the QR code). Technician installation platform 18 then transmits this installation completion code to field service platform 12, which then transmits the code to monetization platform 20, where it is received at step 122. In some embodiments, the transmission of the completion code serves as proof technician 14 has successfully completed the installation, which may be useful for invoicing purposes if the technician is an independent contractor.

Figure 2:
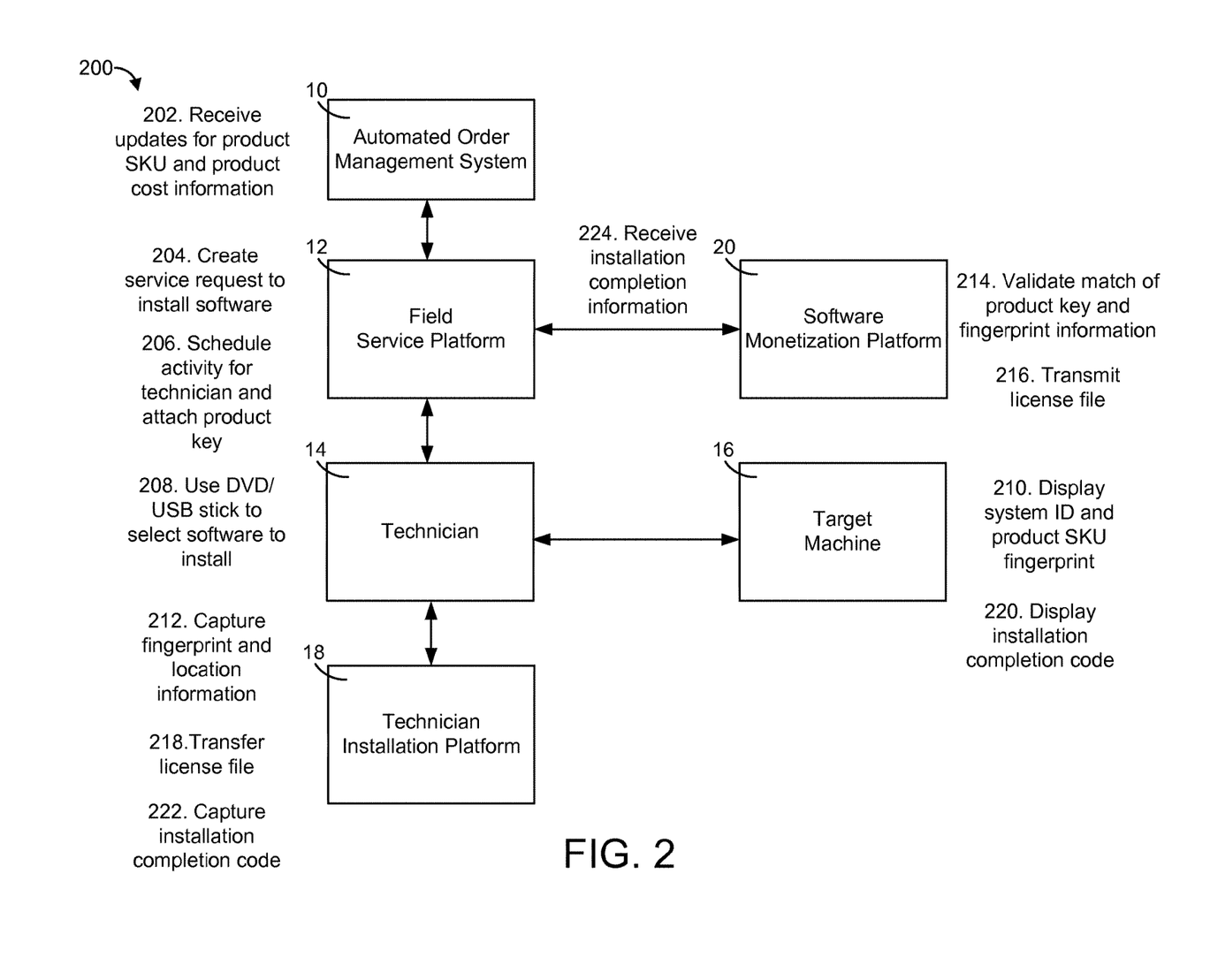
FIG. 2 is a flowchart of a software ordering and licensing process in which the technician installation platform is offline, according to some embodiments.

Referring now to FIG. 2, a flowchart of a software ordering and licensing process 200 in which the target machine 16 is offline is depicted, according to an example embodiment. In some embodiments, process 200 is implemented by any or all of automated order management system 10, field service platform 12, technician 14, target machine 16, technician installation platform 18, and software monetization platform 20. Steps 202, 204, and 206 of process 200 may be substantially similar or identical to steps 102, 104, and 106 of process 100. Like process 100, process 200 begins at step 202 with field service platform receiving updated software information, including pricing and product SKUs from automated order management system 10. At step 204, a customer service agent creates a service request to install software using field service platform 12. After transmitting the service request to software monetization platform 20 and receiving a product key in return, the customer service agent schedules the service request and attaches the product key to the request at step 206.

At step 208, technician 14 arrives at the site of target machine 16. However, unlike the target machine of process 100, the target machine 16 of process 200 is not connected to a wired or wireless network, preventing technician 14 from utilizing target machine 16 to log into the license portal to download the software to be installed. Instead, technician 14 must download the software either in advance and transfer the software installation file to physical media storage (e.g., a DVD, a USB stick). After inserting the physical media storage into target machine 16, technician 14 may begin the installation process.

From this point, process 200 proceeds in an identical or substantially similar manner as process 100. At step 210, target machine 16 displays an end device fingerprint image (e.g., a QR code) containing data such as the system ID of target machine 16 and the product SKU of the installed software. At step 212, technician 14 captures the end device fingerprint image (e.g., by taking a picture of the QR code) with a mobile device. When the end device fingerprint image is captured, the mobile device also captures the location of target machine 16 via GPS or other means. Once the end device fingerprint and location information is captured, it is transmitted to software monetization platform 20. At step 214, software monetization platform 20 validates the end device fingerprint and location information, along with the product key attached to the service request, to ensure that the correct software was installed at the correct location during the scheduled time of the service request as created by field service platform 12.

Still referring to FIG. 2, at step 216, once the installation information is validated, software monetization platform 20 transmits a license file to technician installation platform 18, which technician 14 then installs on target machine 16 at step 218 via use of physical media storage (e.g., a DVD, a USB stick). Once the installation is completed, target machine 16 displays an installation completion code at step 220 which is captured by technician installation platform at step 222. After being routed via field service platform 12, the installation completion information is received by software monetization platform at step 224.

Figure 3:
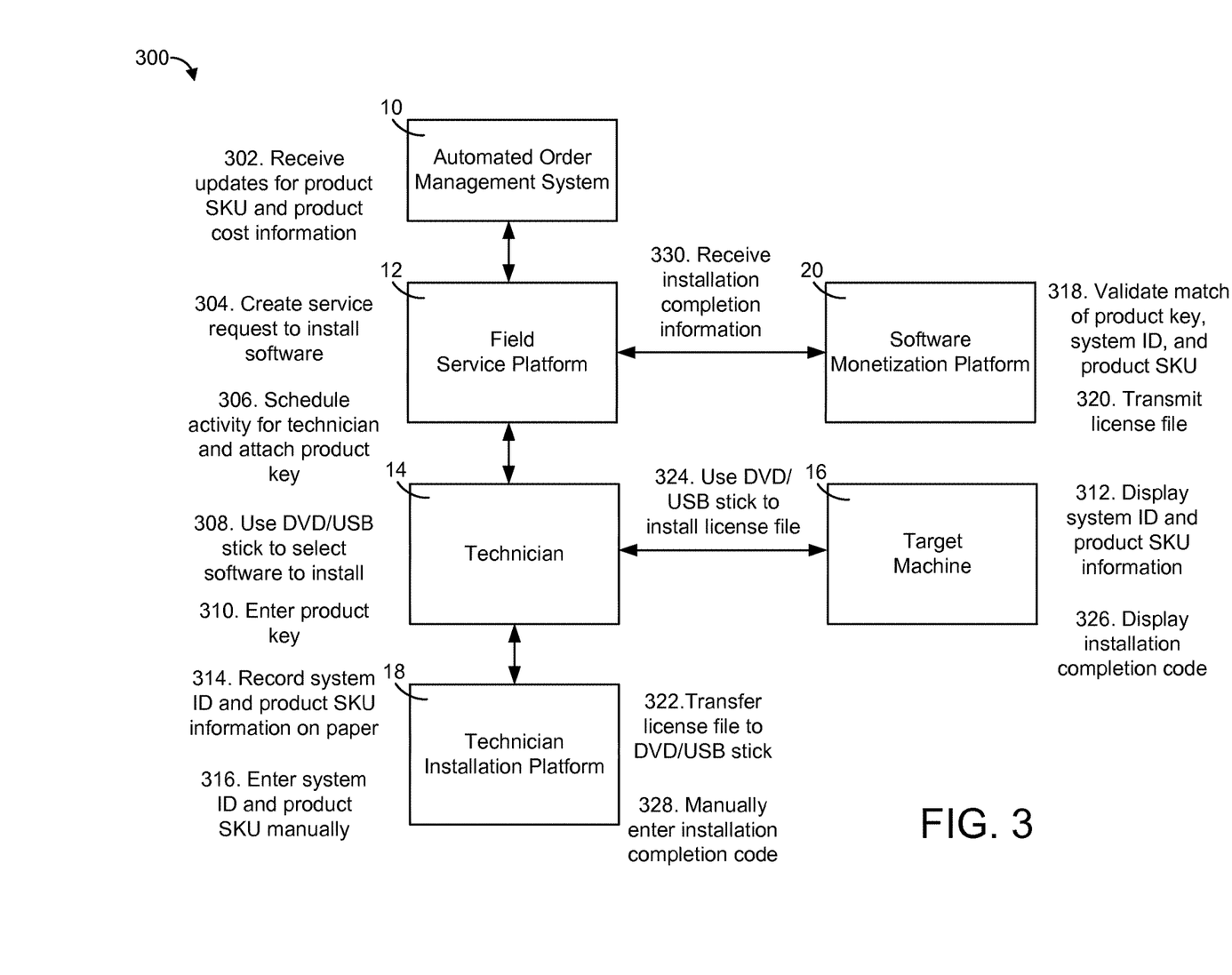
FIG. 3 is a flowchart of a software ordering and licensing process in which the technician is not permitted access to a mobile device, according to some embodiments.

Turning now to FIG. 3, a flowchart of a software ordering and licensing process 300 in which target machine 16 is not connected to a network and technician 14 is not permitted access to a mobile device at the customer site is depicted, according to an example embodiment. In some embodiments, process 300 is implemented by any or all of automated order management system 10, field service platform 12, technician 14, target machine 16, technician installation platform 18, and software monetization platform 20. Steps 302, 304, 306, and 308 may be substantially similar or identical to steps 202, 204, 206, and 208 of process 200. However, because target machine 16 is not connected to a network and technician 14 is not permitted access to a mobile device at the location of target machine 16, technician 14 may be provided with the product key (either in hard copy or electronic form), which the technician manually enters into the target machine 16 at step 310. After the product key is entered, target machine displays end device fingerprint information at step 312, which technician 14 must record on paper at step 314.

Once technician 14 has left the customer site (i.e., the location of target machine 16) and has access to the mobile device containing technician installation platform 18, technician 14 may enter the end device fingerprint information manually into technician installation platform 18 at step 316. Technician platform 18 transmits this information, routed through field service platform 12, to software monetization platform 20. As described in the substantially similar or identical step 214, at step 318, software monetization platform 20 validates the end device fingerprint and location information, along with the product key attached to the service request, to ensure that the correct software was installed at the correct location during the scheduled time of the service request as created by field service platform 12. Once the information is validated, monetization platform 20 transmits the license file at step 320.

Because target machine 16 is not connected to a network, the license file is transmitted to technician installation platform 18, and at step 322, technician 14 transfers the license file to physical media. Upon returning to the customer site at step 324, technician 14 uses the physical media to install the license file on target machine 16. When the installation is complete, target machine 16 displays an installation completion code at step 326 which technician 14 records in hard copy form. After leaving the customer site and regaining access to technician installation platform 18, technician 14 manually enters the installation completion code at step 328. Process 300 concludes at step 330, when the installation completion code is received at software monetization platform 20 via field service platform 12.

Figure 4:
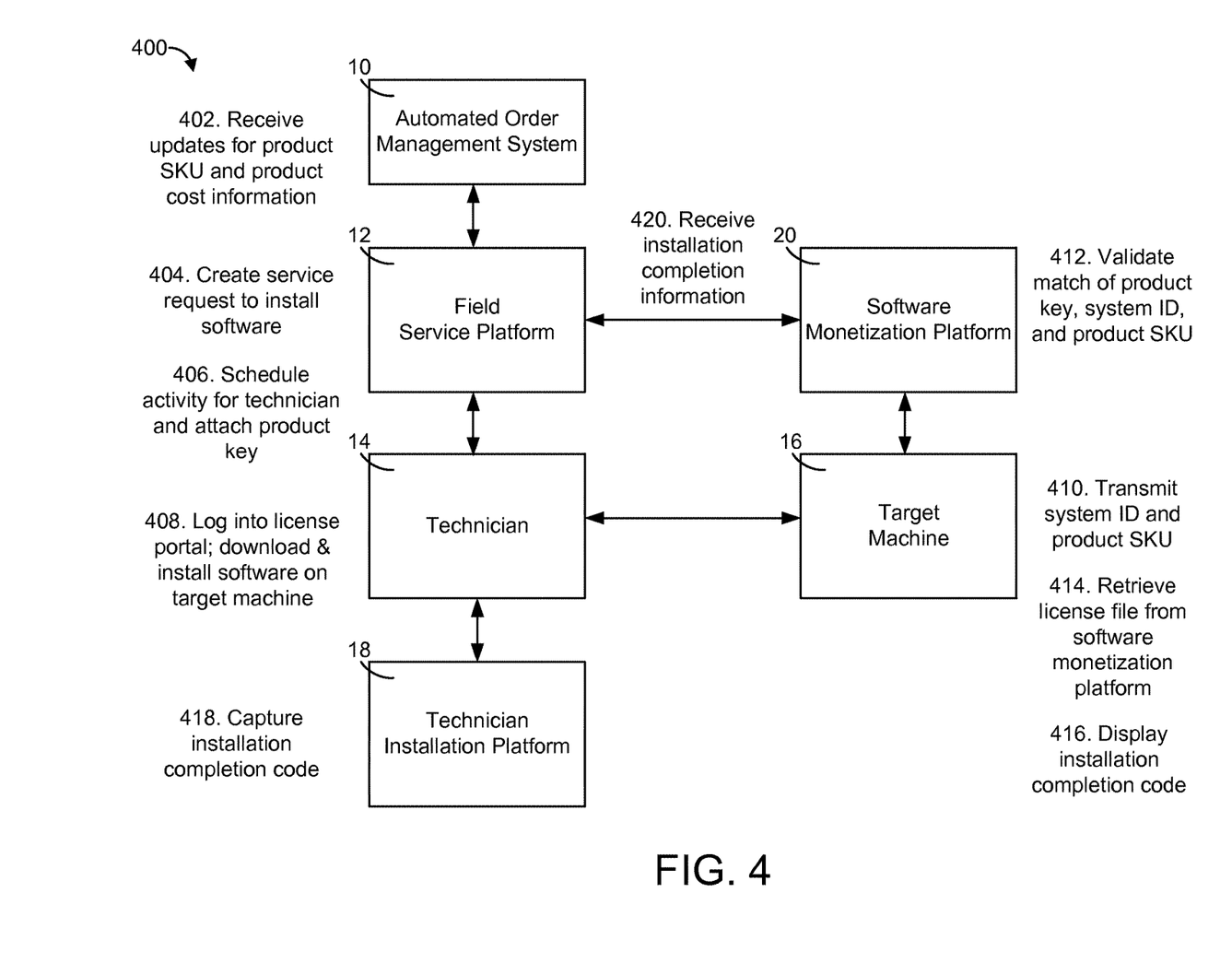
FIG. 4 is a flowchart of a software ordering and licensing process in which the technician is only permitted access to a laptop, according to some embodiments.

Referring to FIG. 4, a flowchart of a software ordering and licensing process 400 in which target machine 16 is connected to a network, but technician 14 is only permitted access to a laptop is depicted, according to an example embodiment. In some embodiments, process 400 is implemented by any or all of automated order management system 10, field service platform 12, technician 14, target machine 16, and software monetization platform 20. Steps 402, 404, and 406 of process 400 proceed in substantially similar or identical fashion to the initial steps of processes 100, 200, and 300 as described above. At step 408, technician 14 logs into the license portal from target machine 16 and manually enters the product key attached to the service request. At step 410, rather than displaying end device fingerprint information for technician installation platform 18 to capture, target machine 16 transmits the end device fingerprint information and product key directly to monetization platform 20, where it is received and validated at step 412.

Once the end device fingerprint information and product key are validated, monetization platform 20 generates and transmits a license file to target machine 16, where it is received at step 414. At step 416, target machine 16 displays an installation completion code (e.g., an alphanumeric code). At step 418, technician 14 enters the completion code into the technician installation platform 18 stored on the laptop. Process 400 concludes with step 420, in which software monetization platform 20 receives the installation completion information from technician platform 18.

Figure 5:
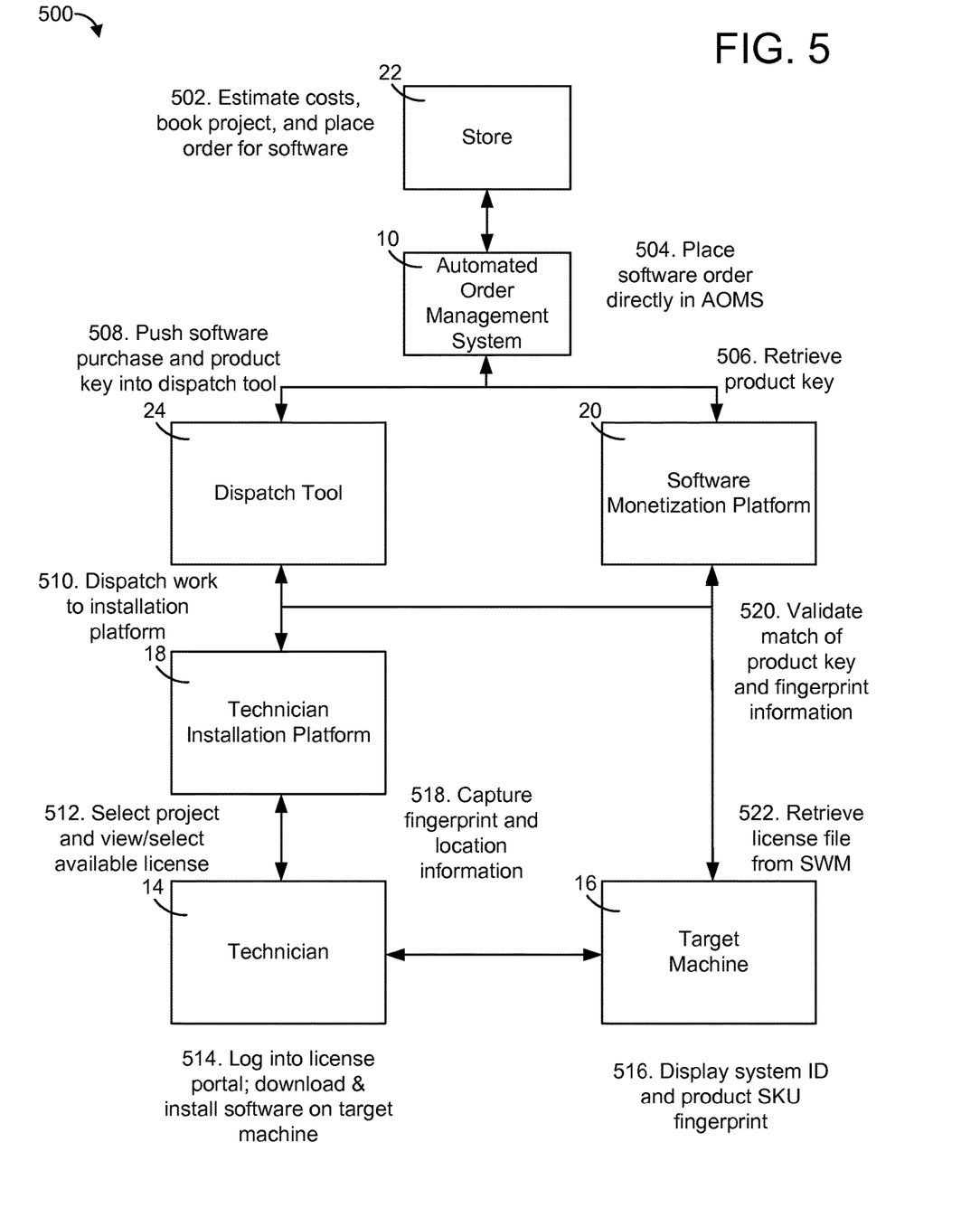
FIG. 5 is a flowchart of a software ordering and licensing process in which the technician installation platform is online, according to some embodiments.

Turning now to FIG. 5, a flowchart of a software ordering and licensing process 500 in which the technician installation platform is online is depicted, according to an alternate example embodiment. Similar to the system of FIG. 1, process 500 may be implemented by automated order management system 10, technician 14, target machine 16, technician installation platform 18, and software monetization platform 20. Other components implementing process 500 may include store 22 and dispatch tool 24. Store 22 may be a computer system used by an administrator of a building that places an order for building software. Dispatch tool 24 may be a computer system used in process 500 in place of field service platform 12 that was utilized in processes 100-400.

Process 500 begins at step 502 when the building administrator estimates the costs of building management software, books the installation project, and places an order for the software into store 22. At step 504, store 22 transmits the software order to automated order management system 10. At step 506, automated order management system 10 transmits the order to software monetization platform 20 and retrieves the unique product key. At step 508, automated order management system 10 pushes the software order and the product key to dispatch tool 24. Instead of scheduling the software order to be completed during a particular installation period (i.e., as with field technician platform 12, described above), dispatch tool 24 pushes the work to technician installation platform 18 at step 510 and technician 14 may retrieve software installation orders to complete on demand.

Continuing with step 512, technician 14 retrieves a project from technician installation platform 18. Once at the customer site, at step 514, technician 14 logs onto the license portal from target machine 16 and selects the software to be installed. From here, process 500 continues in similar fashion to process 100 detailed in FIG. 1. At step 516, target machine 16 displays end device fingerprint information that is captured by technician installation platform at step 518. Software monetization platform validates the end device fingerprint information and the product key at step 520, and target machine retrieves the license file to complete the installation at step 522.

Figure 6:
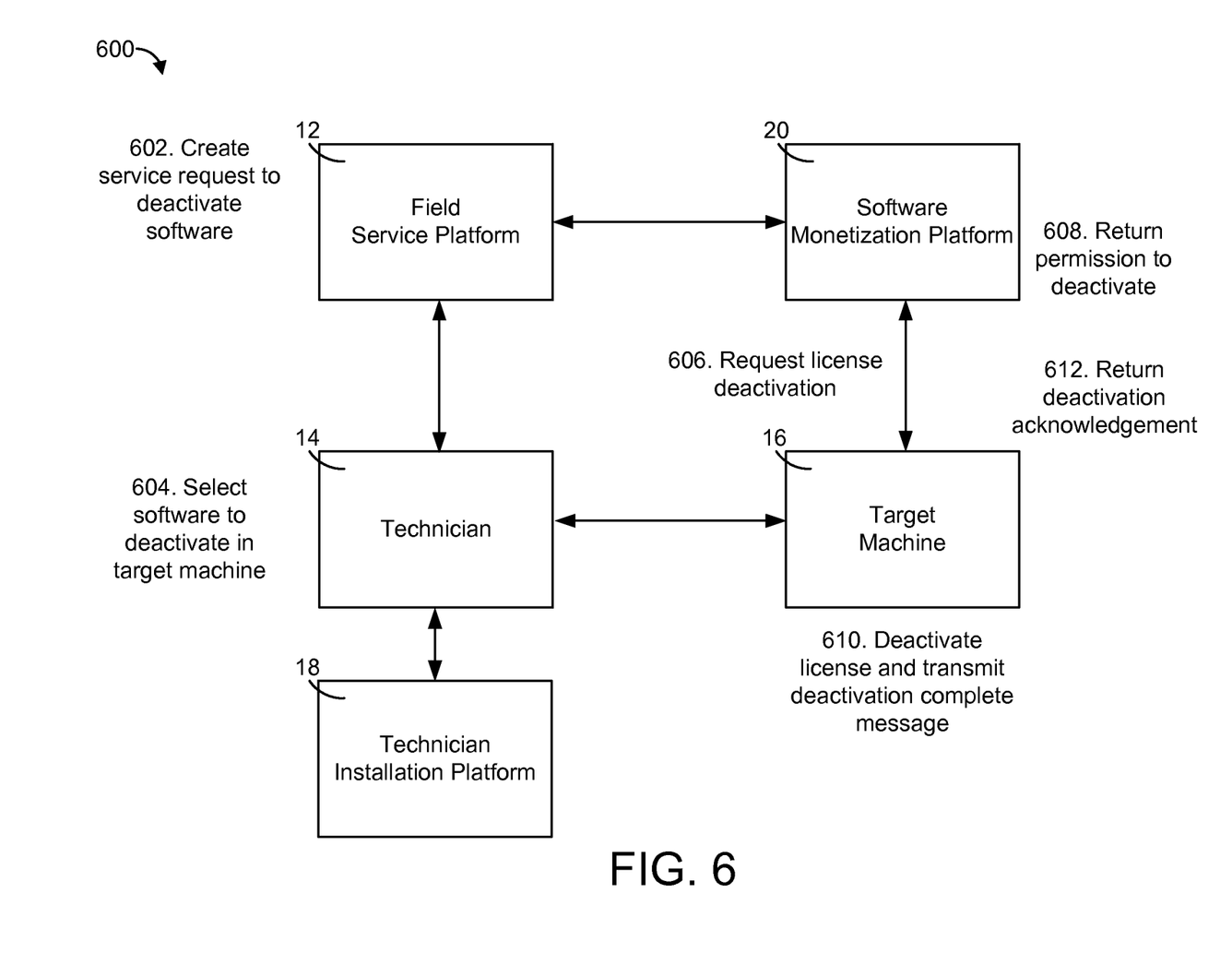
FIG. 6 is a flowchart of a software return and deactivation process in which the field service platform is online, according to some embodiments.

Referring now to FIG. 6, a flowchart of a software return and deactivation process 600 in which the field service platform is online is depicted, according to an example embodiment. Similar to the system described with reference to FIGS. 1-4 above, process 600 may be implemented by field service platform 12, technician 14, target machine 16, technician installation platform 18, and software monetization platform 20. At step 602, a customer service agent receives a request from a customer or other entity to deactivate software installed on target machine 16. The customer service agent creates a service request to deactivate the software using field service platform 12 and assigns a technician 14 to complete the deactivation. In some embodiments, technician 14 receives a notification of the scheduled service request using technician installation platform 18.

At step 604, technician 14 arrives at the customer site of target machine 16 and selects the software to deactivate on target machine 16. At step 606, target machine 16 communicates with software monetization platform 20 via wired or wireless connection to request deactivation of the software license. In response, software monetization platform 20 returns a permission to deactivate to target machine 16 at step 608. Continuing with step 610, target machine 16 deactivates the software license and, once complete, transmits a completion message to software monetization platform 20. Finally, process 600 concludes at step 612 when software monetization platform 20 returns a deactivation acknowledgement message to target machine 16.

Figure 7:
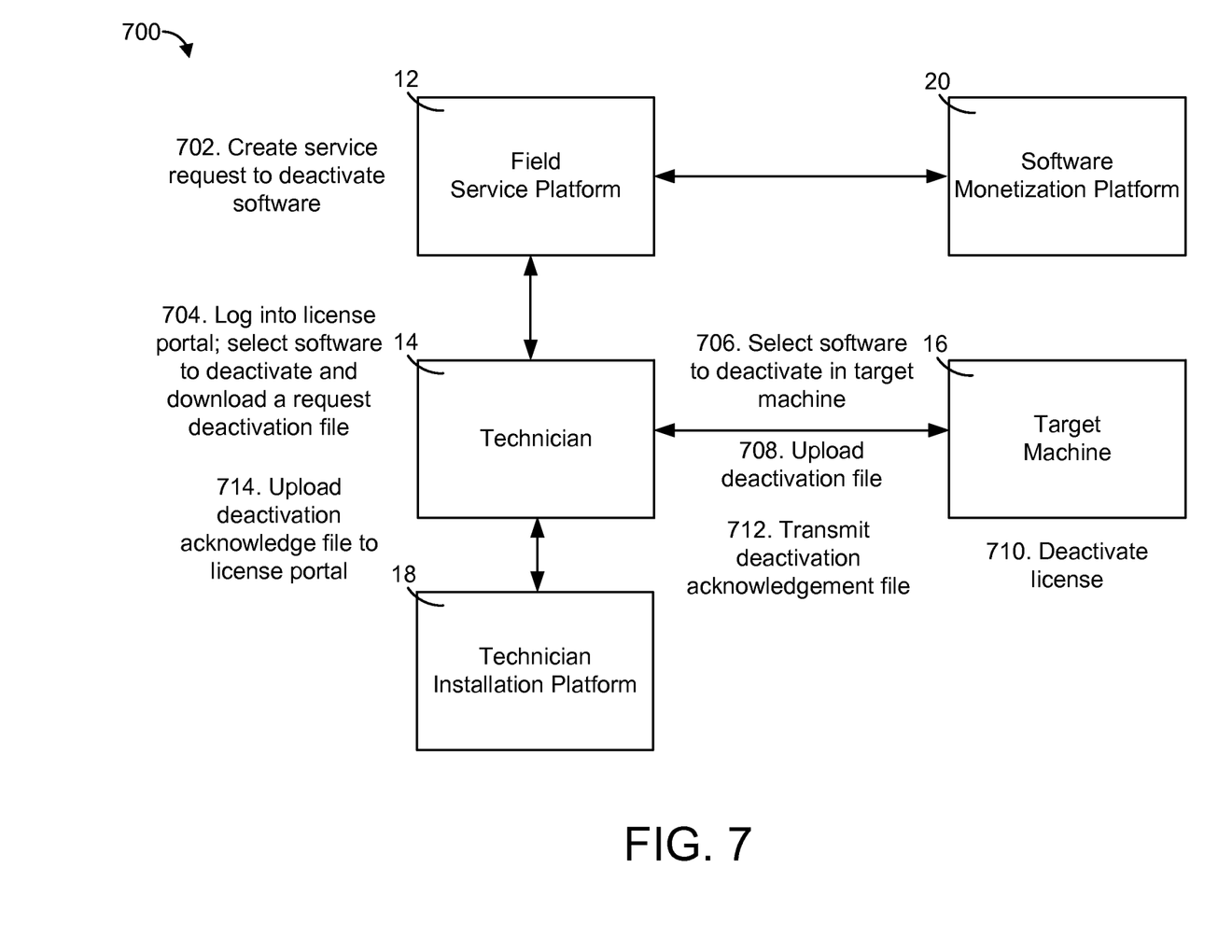
FIG. 7 is a flowchart of a software return and deactivation process in which the field service platform is offline, according some embodiments.

Referring to FIG. 7, a flowchart of a software return and deactivation process 700 in which the field service platform is offline is depicted, according to an example embodiment. Process 700 may be implemented by field service platform 12, technician 14, target machine 16, and technician installation platform 18, among other system components. At step 702, field service platform 12 creates and transmits a service request to deactivate software on target machine 16. In some embodiments, the request to deactivate the software may originate from the customer that owns target machine 16. In other embodiments, the request may originate from software monetization platform 20.

After technician 14 receives the service request, at step 704, technician 14 logs into the license portal and downloads a request deactivation file. In some embodiments, technician 14 accesses the license portal via technician installation platform 18. Continuing with step 706, from target machine 16, technician 14 selects the software to be deactivated and, at step 708, uploads the deactivation file obtained from the license portal. At step 710, target machine 16 deactivates the software, and, at step 712, transmits a software deactivation acknowledgement file to technician installation platform 18. Concluding process 700, at step 714, technician installation platform 18 uploads the deactivation acknowledgement file to the license server. In some embodiments, the upload of this file may serve as proof that the technician has completed the service request. In other embodiments, the upload of the file may trigger a cancellation of a customer's software subscription.

Figure 8:
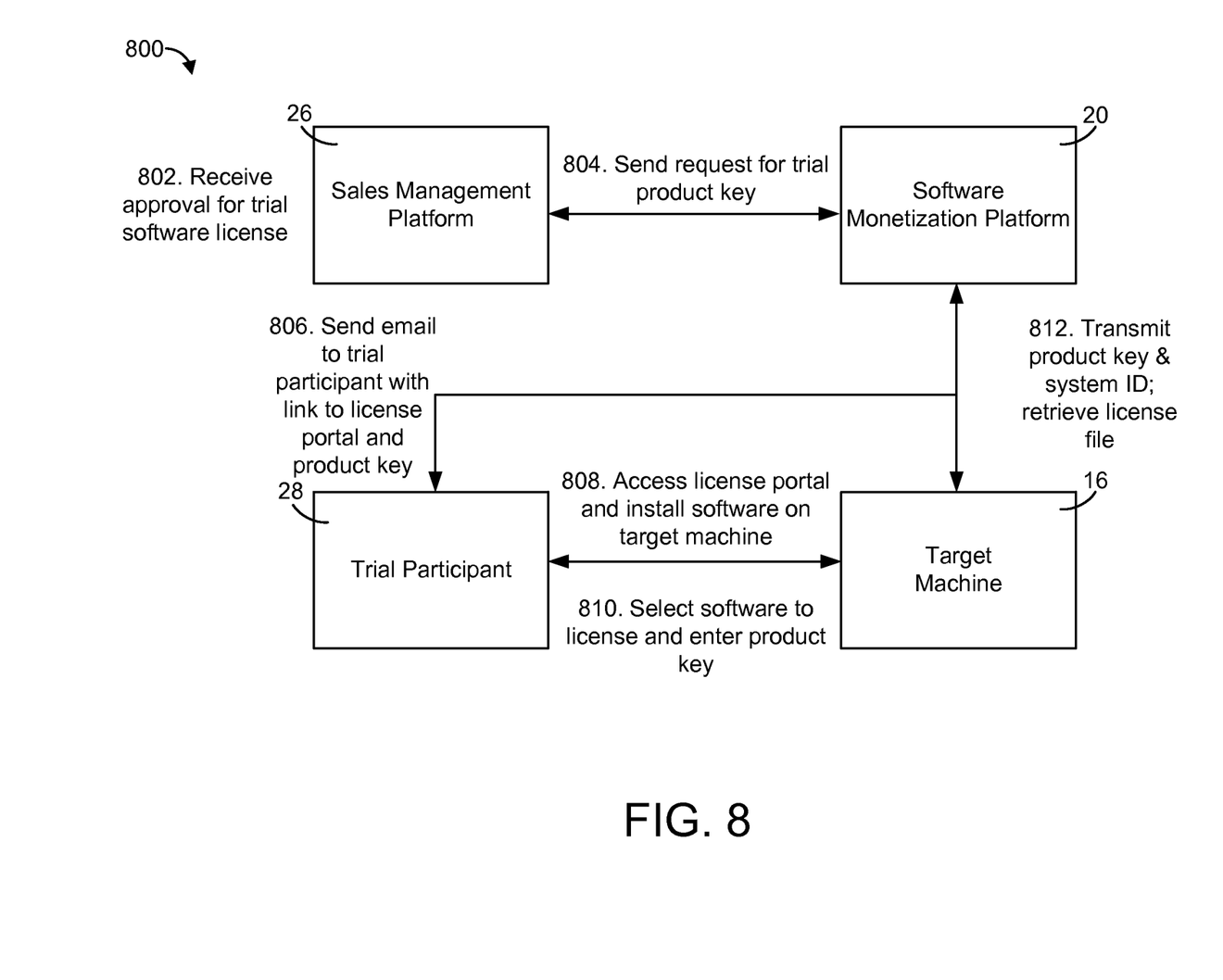
FIG. 8 is a flowchart of a trial or demo software ordering process, according to some embodiments.

Turning now to FIG. 8, a flowchart of a trial or demo software ordering process 800 is depicted, according to an example embodiment. Process 800 may be implemented by any or all of target machine 16, software monetization platform 20, sales management platform 26, and trial participant 28. Target machine 16 and software monetization platform 20 are identical or substantially similar to the components described with reference to FIGS. 1-4 above. Sales management platform 26 is a computer system configured to manage requests for trial software licenses. Trial participant 28 is an individual or entity requesting a trial software license for target machine 16.

Process 800 begins with step 802, in which a software sales agent requests and receives approval to install a trial software license. In some embodiments, step 802 comprises the sales agent entering a request into sales management platform 26 and receiving an approval from a sales manager or supervisor. Once the sales manager has approved the request within sales management platform 26, sales management platform 26 may send a request to software monetization platform 20 to generate a trial license product key. In some embodiments, the trial license product key has the same form (e.g., number of digits, method of encryption) as a non-trial license product key. In other embodiments, the trial license product key has a different form that may serve as an indication to the license server that the product key is for a trial license.

Once software monetization platform 20 has generated the trial license product key, the platform sends an email to trial participant 28 at step 806 that includes a link to a license portal and the product key. In some embodiments, this email may be automatically generated and sent by software monetization platform 20 using trial participant information obtained from the trial license request generated by sales management platform 26. In other embodiments, this email may be manually generated and sent by a user of software monetization platform 20.

Process 800 then continues with step 808. After receiving the license email, trial participant 28 accesses the license portal from target machine 16 by clicking on the link in the email. Once the trial participant has successfully accessed the license portal, at step 810, the participant selects the desired trial software and manually enters the product key provided in the email into an appropriate field of the license program. Finally, at step 812, target machine 16 transmits the received product key and a system ID identifying the target machine to software monetization platform 20. After monetization platform 20 has performed an authentication process to ensure that the participant target machine matches the information used to generate the trial product key, monetization platform 20 transmits a license file to target machine 16 that may be utilized to complete the trial software installation process.

Figure 9:
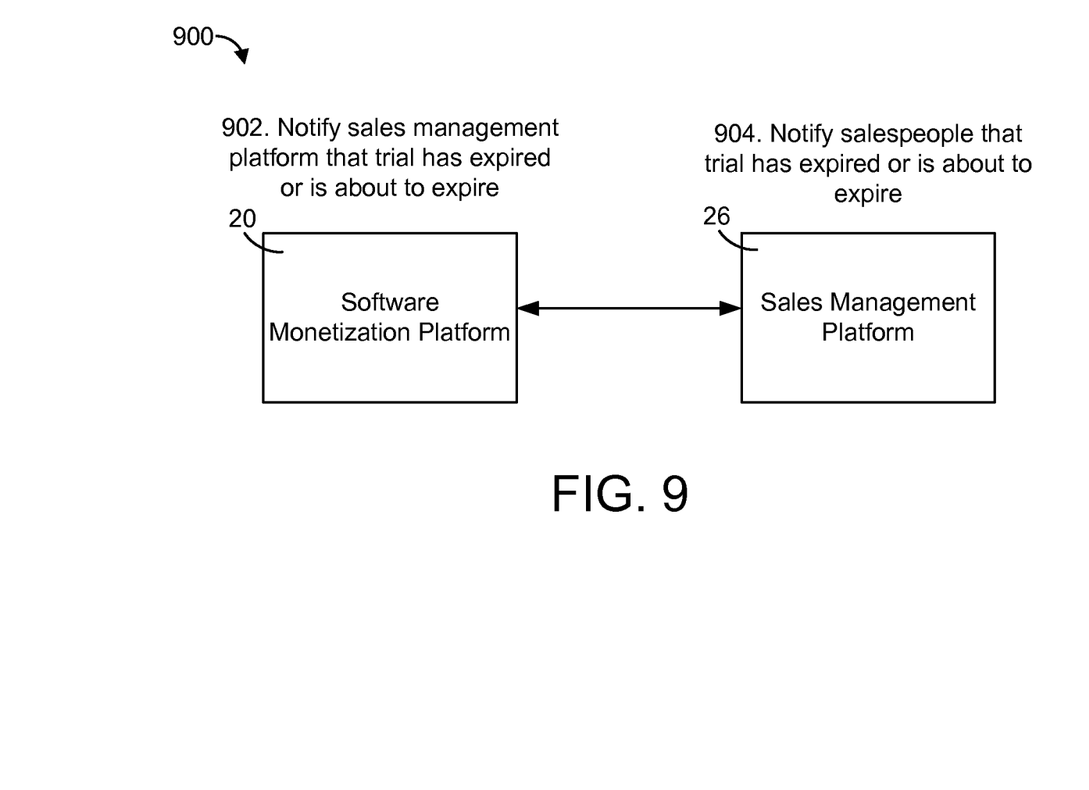
FIG. 9 is a flowchart of a process for notifying a salesperson of a trial or demo software license expiration, according to some embodiments.

Referring to FIG. 9, a flowchart of a process 900 for notifying a salesperson of a trial or demo software license expiration is depicted, according to an example embodiment. Process 900 may be performed by software monetization platform 20 and sales management platform 26, among other components. Process 900 begins with step 902, in which software monetization platform 20 sends a notification to sales management platform 26 that a trial software installation either has expired or is about to expire. In various embodiments, the notification may be in the form of a platform application message, web message, or text message. The timing of the notification may be configurable (e.g., one week before trial expires, day of trial expiration) by an administrator of software monetization platform 20, by an administrator of sales management platform 26, or by a salesperson.

Process 900 concludes with step 904, in which sales management platform 26 sends a notification to a salesperson that the trial software installation has expired or is about to expire. Similar to step 902, in various embodiments, the notification may be in the form of a platform application message, web message, or text message. Upon receiving the notification, the salesperson may contact the trial participant to receive feedback regarding the trial software license and/or determine whether the participant would like to purchase a full software license.

Figure 10:
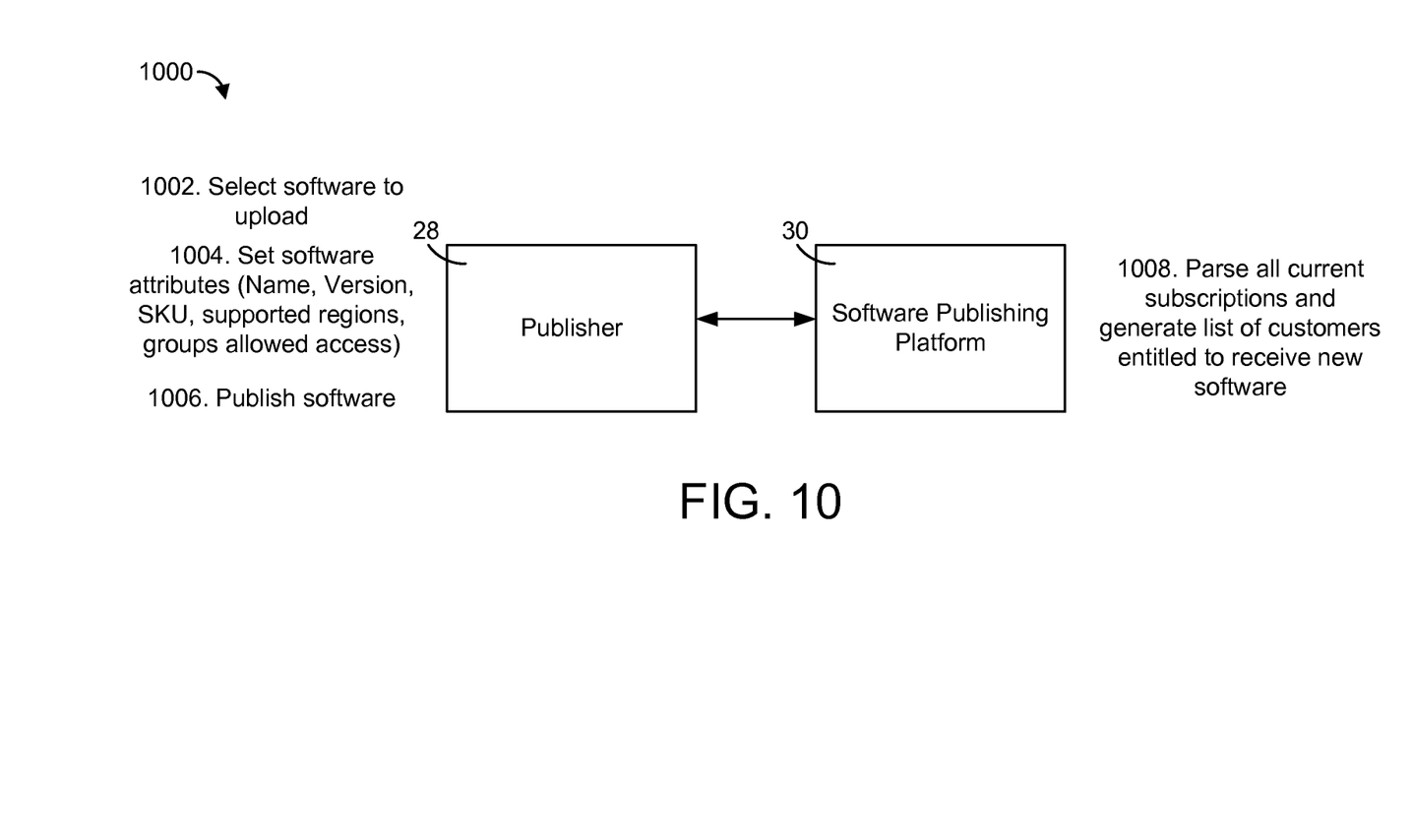
FIG. 10 is a flowchart of a process for publishing new software and creating a list of eligible customers, according to some embodiments.

Referring now to FIG. 10, a flowchart of a process 1000 for publishing new software and creating a list of eligible customers is depicted, according to an example embodiment. Process 1000 may be performed by publisher 28 and software publishing platform 30, among other components. In some embodiments, publisher 28 is computer system configured to collect attributes of software and upload the software to a publishing platform. In other embodiments, publisher 28 is component of or application installed on a component of the software ordering and licensing system of FIG. 1. Software publishing platform 30 may be a computer system that includes databases storing software and customer information, including the customer software subscription information. In various embodiments, software publishing platform 30 is also a component of or application installed on a component of the software ordering and licensing system of FIG. 1.

Process 1000 begins with step 1002, in which the publisher 28 selects the software file to upload to publishing platform 30. In some embodiments, the software file is a new software application. In other embodiments, the software file is an update to an existing software application that may be installed at multiple customer sites with corresponding customer subscriptions. At step 1004, publisher 28 sets attributes for the software (e.g., name, version, SKU, supported regions, groups allowed access). In some embodiments, publisher 28 automatically identifies this information from the software file. In other embodiments, these attributes are entered manually by a user of publisher 28. At step 1006, publisher 28 publishes the software file. In some embodiments, publishing the file involves transmitting the file to software publishing platform 30. Finally, process 100 concludes with step 1008, in which software publishing platform 30 parses customer subscription lists stored in the customer databases and generates a list of customers entitled to receive the newly published software due to the customer purchase of a software subscription.

The construction and arrangement of the systems and methods as shown in the various exemplary embodiments are illustrative only. Although only a few embodiments have been described in detail in this disclosure, many modifications are possible. For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for monetizing deployment of building management software that operates an HVAC device, the system comprising:
   one or more processors coupled to non-transitory memory, wherein the one or more processors:
      create a service task for a field technician including information identifying the building management software to be installed on an end device;
      generate a unique product key and attach the unique product key to the service task;
      transmit the service task to a field technician platform that is accessed by the field technician;
      validate bound data received from the field technician platform, the bound data comprising end device fingerprint information and the unique product key;
      generate a license file that completes installation of the building management software; and
      receive an installation completion code from the field technician platform.

2. The system of claim 1, wherein the installation completion code is an alphanumeric code.

3. The system of claim 1, wherein the installation completion code is captured by the field technician platform as a quick response (QR) code.

4. The system of claim 1, wherein the unique product key is an alphanumeric code.

5. The system of claim 1, wherein the end device fingerprint information comprises at least one of a software product stock keeping unit (SKU), an end device identification number, a customer identification number, and a service task ticket number.

6. The system of claim 1, wherein the end device fingerprint information is captured by the field technician platform as a QR code.

7. The system of claim 1, wherein the bound data further comprises a location of the end device captured by the field technician platform via global positioning system (GPS).

8. A method for monetizing deployment of building management software that operates an HVAC device, the method comprising:
   creating a service task for a field technician including information identifying the building management software to be installed on an end device;

generating a unique product key and attaching the unique product key to the service task;
transmitting the service task to a field technician platform that is accessed by the field technician;
validating bound data received from the field technician platform, the bound data comprising end device fingerprint information and the unique product key;
generating a license file that completes installation of the building management software; and
receiving an installation completion code from the field technician platform.

9. The method of claim 8, wherein the installation completion code is an alphanumeric code.

10. The method of claim 8, wherein the installation completion code is captured by the field technician platform as a quick response (QR) code.

11. The method of claim 8, wherein the unique product key is an alphanumeric code.

12. The method of claim 8, wherein the end device fingerprint information comprises at least one of a software product stock keeping unit (SKU), an end device identification number, a customer identification number, and a service task ticket number.

13. The method of claim 8, wherein the end device fingerprint information is captured by the field technician platform as a QR code.

14. The method of claim 8, wherein the bound data further comprises a location of the end device captured by the field technician platform via global positioning system (GPS).

15. A method for monetizing software deployment, the method comprising:
creating a service task for a field technician, the service task comprising an installation date and time;
generating a unique product key and attaching the unique product key to the service task;
transmitting the service task to a field technician platform that is accessed by the field technician;
validating bound data received from the field technician platform, the bound data comprising end device fingerprint information and the unique product key;
generating a license file that completes installation of the software; and
receiving an installation completion code from the field technician platform.

16. The method of claim 15, wherein validating the bound data received from the field technician platform further comprises determining whether the bound data was received after an expiration period of the unique product key.

17. The method of claim 16, wherein the expiration period of the unique product key is determined at least in part by the installation date and time.

18. The method of claim 16, wherein the end device fingerprint information is captured by the field technician platform as a quick response (QR) code.

* * * * *